United States Patent
Farooq et al.

(10) Patent No.: US 12,208,758 B2
(45) Date of Patent: Jan. 28, 2025

(54) BUMPER ASSEMBLY INCLUDING RESETTABLE ENERGY ABSORBER

(71) Applicant: Ford Global Technologies, LLC, Dearborn, MI (US)

(72) Inventors: S. M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 17/934,218

(22) Filed: Sep. 22, 2022

(65) Prior Publication Data

US 2024/0101058 A1 Mar. 28, 2024

(51) Int. Cl.
*B60R 19/28* (2006.01)
*B60R 19/38* (2006.01)

(52) U.S. Cl.
CPC .............. *B60R 19/28* (2013.01); *B60R 19/38* (2013.01)

(58) Field of Classification Search
CPC ....... B60R 19/023; B60R 19/24; B60R 19/26; B60R 19/28; B60R 19/36
USPC ......................................... 296/124, 132, 135
See application file for complete search history.

(56) References Cited

U.S. PATENT DOCUMENTS

| | | | | |
|---|---|---|---|---|
| 2,094,739 A * | 10/1937 | Geiger | ................... | B60R 19/26 293/137 |
| 2,142,328 A * | 1/1939 | Mutter | ................... | B60R 19/02 293/137 |
| 3,756,643 A | 9/1973 | Weed | | |
| 5,029,919 A * | 7/1991 | Bauer | ................... | F16F 9/0472 267/221 |
| 6,050,624 A * | 4/2000 | Kim | ........................ | B60R 19/28 293/137 |
| 6,393,999 B1 * | 5/2002 | Schneider | ................ | F16F 7/123 188/371 |
| 6,976,718 B2 | 12/2005 | Nakanishi | | |
| 8,113,555 B2 * | 2/2012 | Faruque | ................... | B60R 19/34 293/118 |
| 8,544,905 B2 * | 10/2013 | Handing | ................. | B60R 19/40 293/118 |
| 9,067,552 B1 | 6/2015 | Cheng et al. | | |
| 9,227,585 B1 | 1/2016 | Barbat et al. | | |
| 10,875,480 B2 * | 12/2020 | Fichtinger | ............... | B60R 19/12 |
| 2013/0238197 A1 | 9/2013 | Faruque et al. | | |

(Continued)

FOREIGN PATENT DOCUMENTS

| | | | | |
|---|---|---|---|---|
| CN | 209479608 U | 10/2019 | | |
| CN | 112455373 A * | 3/2021 | ............ | B60R 19/18 |
| JP | 2004161109 A | 6/2004 | | |

*Primary Examiner* — Jason S Daniels

(74) *Attorney, Agent, or Firm* — Frank A. MacKenzie; Brooks Kushman P.C.

(57) ABSTRACT

A vehicle includes a vehicle frame and a bumper. The vehicle frame includes a frame-rail end. The frame-rail end has a vehicle-forward end and a bore at the vehicle-forward end. The vehicle includes a resettable energy absorber supporting the bumper at the vehicle-forward end of the frame-rail end. The resettable energy absorber is moveable with the bumper relative to the frame-rail end between an extended position and a compressed position. The resettable energy absorber extends into the bore of the frame-rail end from the extended position to the compressed position.

20 Claims, 6 Drawing Sheets

(56) References Cited

U.S. PATENT DOCUMENTS

2017/0259766 A1 9/2017 Farooq et al.
2019/0275981 A1 9/2019 Farooq et al.

* cited by examiner

BUMPER ASSEMBLY INCLUDING RESETTABLE ENERGY ABSORBER

BACKGROUND

The Global Technology Regulation (GTR) and the New Car Assessment Program (NCAP) specify leg-injury criteria for pedestrian protection. The regulations are aimed at reducing the impact force to the legs of a pedestrian by a vehicle bumper during a vehicle-pedestrian impact.

Some vehicles, such as light duty trucks and sport utility vehicles (SUVs), for example, may have a bumper height that could lead to an uneven impact on the femur and/or tibia of the pedestrian by the vehicle bumper during the vehicle-pedestrian impact. For example, light duty trucks may have bumper heights to provide ground clearance to clear speed bumps, curbs, parking blocks, inclined driveway ramps, hills, rough roads, etc. Some vehicles with such bumper heights also have off-road capabilities that preclude having any components below the bumper. As such, there is an opportunity to design a vehicle front-end for pedestrian leg impact energy management while addressing ground clearance requirements.

DETAILED DESCRIPTION

A vehicle includes a vehicle frame having a frame-rail end and a bumper. The frame-rail end has a vehicle-forward end and a bore at the vehicle-forward end. A resettable energy absorber supports the bumper at the vehicle-forward end of the frame-rail end. The resettable energy absorber is moveable with the bumper relative to the frame-rail end between an extended position and a compressed position. The resettable energy absorber extends into the bore of the frame-rail end from the extended position to the compressed position.

The energy absorber may include a plate fixed to the frame-rail end, a stud fixed to the bumper and slidably extending through the plate, and a spring on the stud between the bumper and the plate. A head may be on the stud between the plate and the frame-rail end. The head may be in the bore of the frame-rail end in both the extended position and the compressed position. Fasteners may connect the plate to the frame-rail end. The fasteners may be spaced from each other on the plate in a pattern having an outer boundary. The stud may extend through the plate inside the outer boundary of the pattern. The frame-rail end may include a base elongated along a vehicle-longitudinal axis and a flange extending radially from the base. Fasteners may connect the plate to the flange. The spring may be resiliently compressible between the plate and the bumper. The spring may be a coil spring. The spring may be coiled around the stud.

The energy absorber may include a plate fixed to the frame-rail end, a plurality of studs fixed to the bumper and slidably extending through the plate, and a spring on each stud between the bumper and the plate. Fasteners may connect the plate to the frame-rail end. The fasteners may be spaced from each other on the plate in a pattern having an outer boundary, the studs extending through the plate inside the outer boundary of the pattern. Four fasteners may connect the plate to the frame-rail end, the four fasteners being spaced from each other on the plate in a rectangular pattern, the studs extending through the plate inside the rectangular pattern. The frame-rail end may include a base elongated along a vehicle-longitudinal axis and a flange extending radially from the base. Fasteners may connect the plate to the flange. The fasteners may be spaced from each other on the plate in a pattern having an outer boundary, the stud extending through the plate inside the outer boundary of the pattern.

The vehicle frame includes frame rails elongated along a vehicle-longitudinal axis, the frame-rail ends extending vehicle-forward of the frame rails, respectively. The frame-rail ends are designed to deform, i.e., crush, relative to the frame rail during frontal-vehicle impact. The frame-rail end may be elongated along the vehicle-longitudinal axis.

Figure 4A:
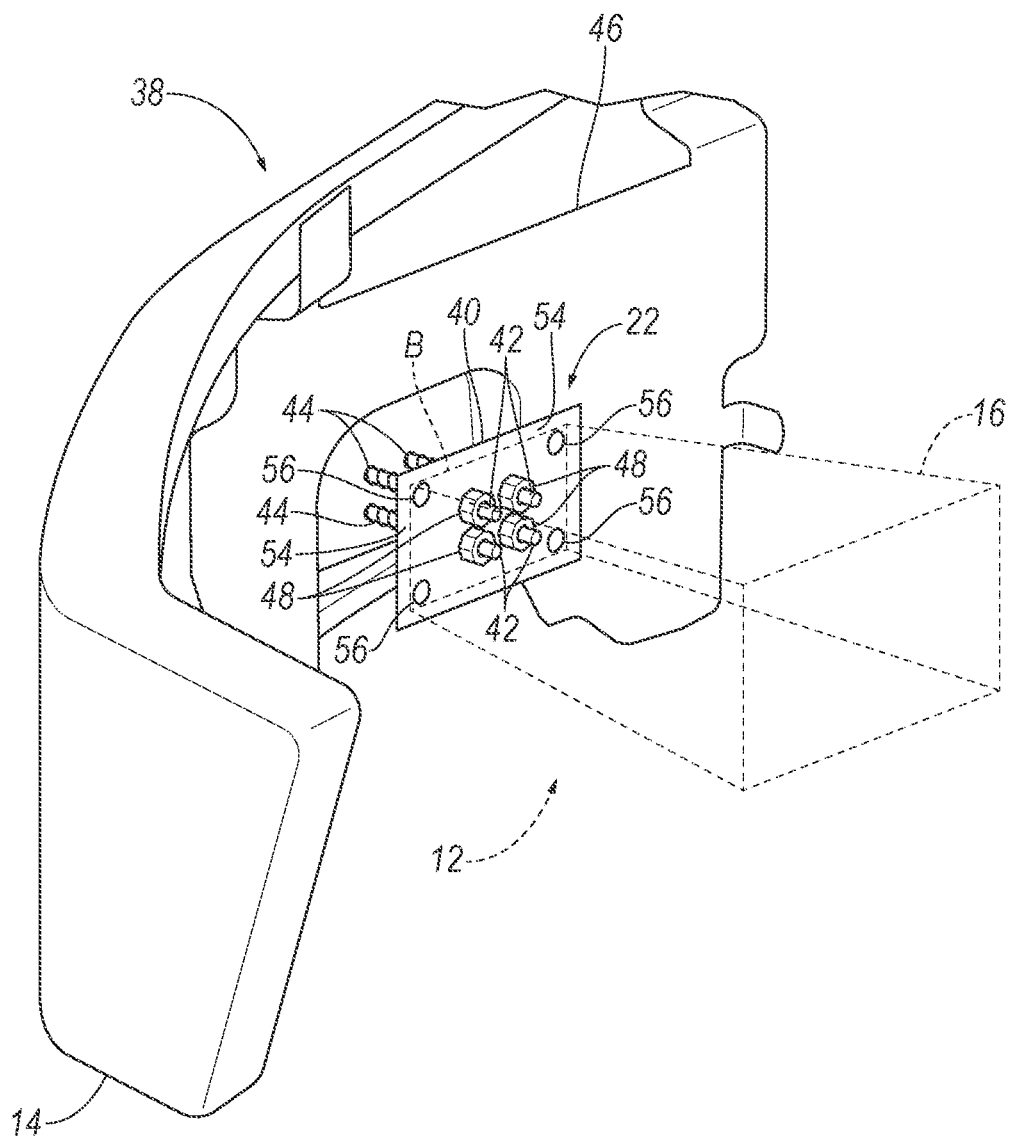
FIG. 4A is a perspective view of a portion of the bumper and the resettable energy absorber with the resettable energy absorber in an extended position.
Figure 4B:
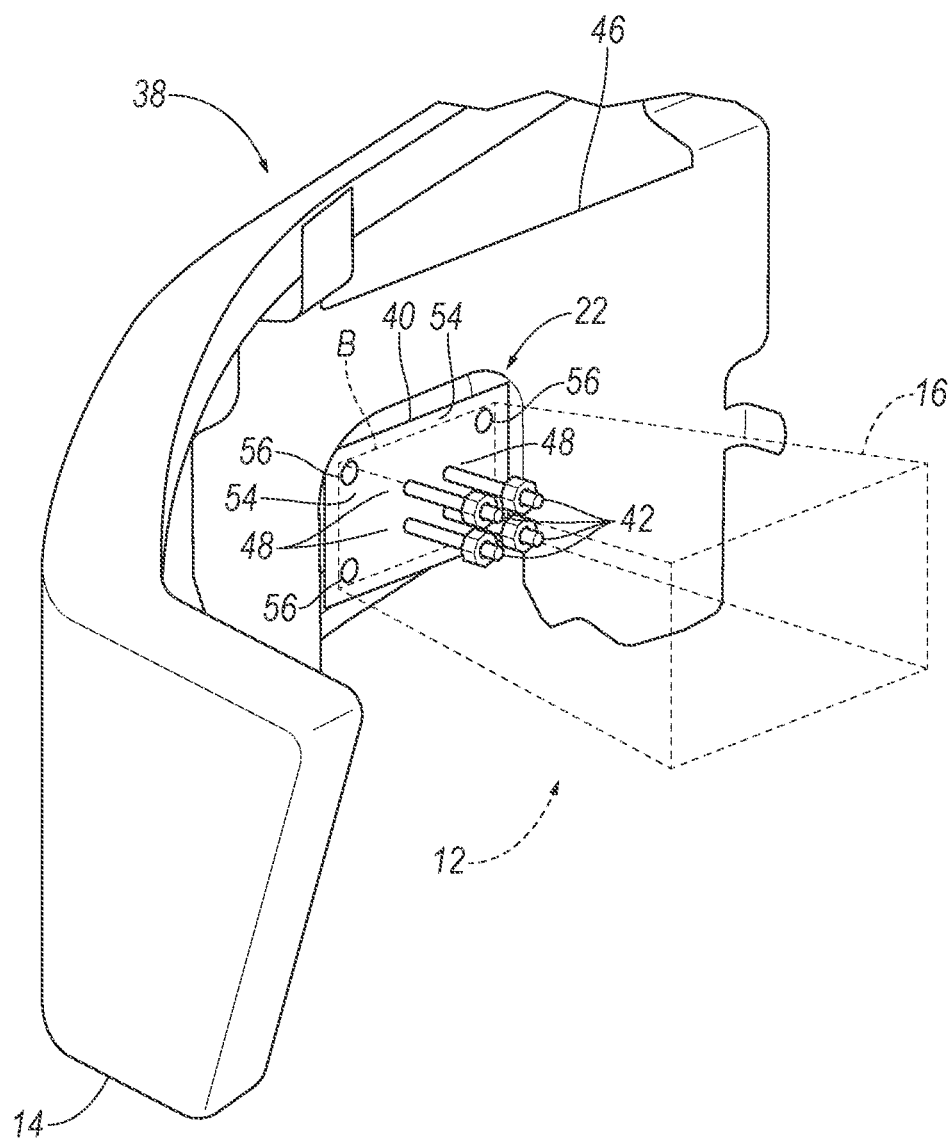
FIG. 4B is a perspective view of a portion of the bumper and the resettable energy absorber with the resettable energy absorber in a compressed position.
Figure 5A:
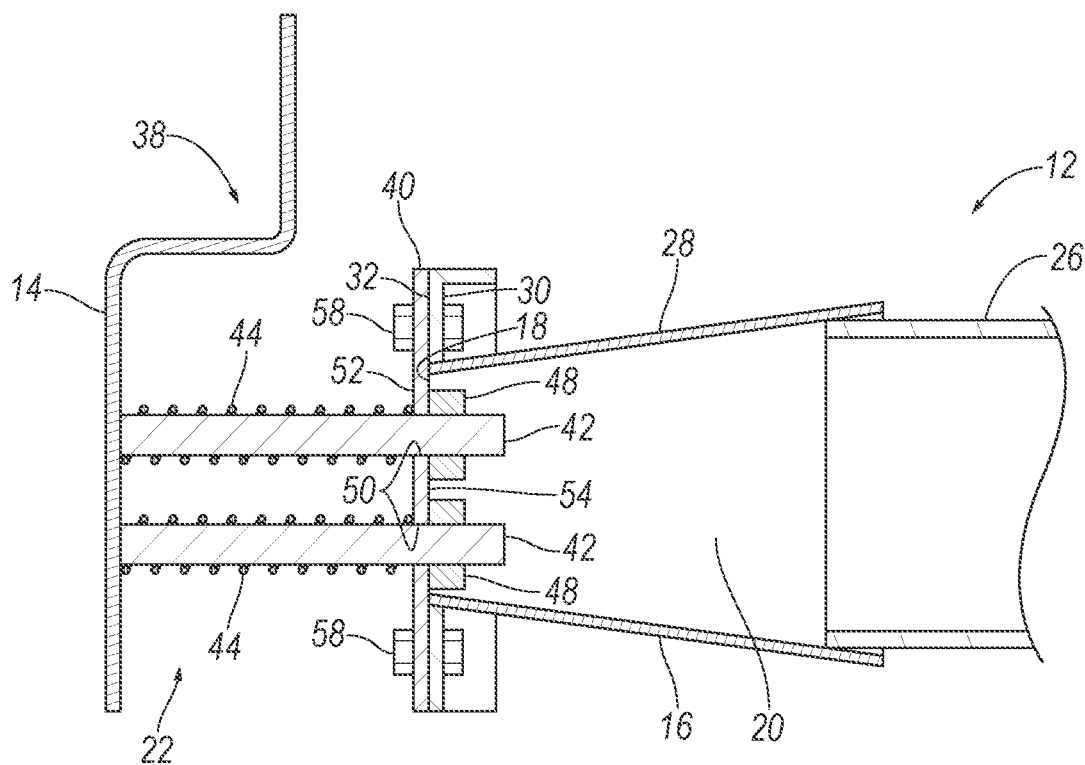
FIG. 5A is a cross-sectional view through the bumper and the resettable energy absorber in an extended position.
Figure 5B:
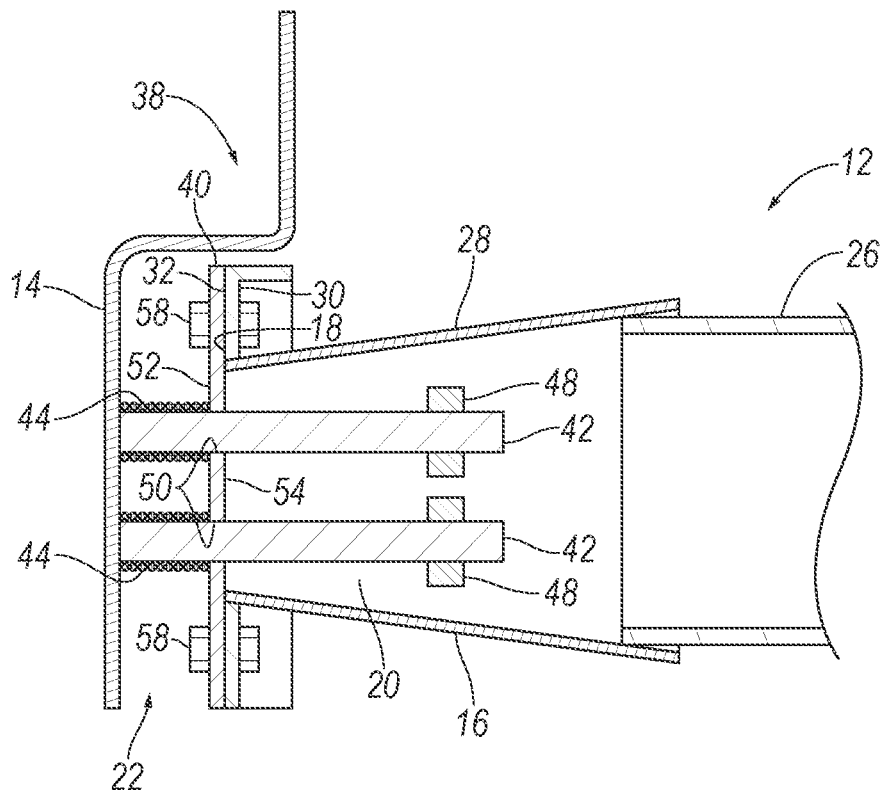
FIG. 5B is a cross-sectional view through the bumper and the resettable energy absorber in an extended position.

With reference to the Figures, wherein like numerals indicate like parts throughout the several views, a vehicle 10 includes a vehicle frame 12 and a bumper 14. The vehicle frame 12 includes a frame-rail end 16. The frame-rail end 16 has a vehicle-forward end 18 and a bore 20 at the vehicle-forward end 18. The vehicle 10 includes a resettable energy absorber 22 supporting the bumper 14 at the vehicle-forward end 18 of the frame-rail end 16. The resettable energy absorber 22 is moveable with the bumper 14 relative to the frame-rail end 16 between an extended position (FIGS. 4A and 5A) and a compressed position (FIGS. 4B and 5B). The resettable energy absorber 22 extends into the bore 20 of the frame-rail end 16 from the extended position to the compressed position.

The resettable energy absorber 22 absorbs energy during certain vehicle impacts such as, for example, pedestrian impacts. For example, during a pedestrian impact, the resettable energy absorber 22 moves toward the vehicle-forward end 18 against spring bias to a compressed position to absorb energy from the impact and reduce energy delivered from the bumper 14 to the pedestrian. After force on the bumper 14 is removed, the spring 44 returns to the extended position, i.e., the energy absorber is resettable. The movement of the resettable energy absorber 22 into the bore 20 from the extended position to the compressed position relieves packaging constraints.

The bumper 14, as an example, may impact the knee of a pedestrian impact test leg form during a standardized test. The leg form may be a flexible pedestrian leg impactor (Flex-PLI) leg form. Example regulations that can use the leg form include Global Technical Regulation (GTR), ECE R127 and Korean Motor Vehicle 10 12 Safety Standards (KMVSS). Example new car assessment programs that can use the leg form include EuroNCAP, CNCAP, and ANCAP.

The vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, as an example, may have a relatively high ride height.

The vehicle 10 includes the vehicle frame 12 and a vehicle body 24. The vehicle body 24 and the vehicle frame 12 may have a body-on-frame construction (also referred to as a cab-on-frame construction) in which the vehicle body 24 and vehicle frame 12 are separate components, i.e., are modular, and the vehicle body 24 is supported on and affixed to the vehicle frame 12. In the example shown in the Figures, the vehicle 10 has a body-on-frame construction. As another example, the vehicle body 24 and the vehicle frame 12 may be of a unibody construction in which the vehicle frame 12 is unitary with the vehicle body 24 (including frame rails 26, pillars, roof rails, etc.). Alternatively, the vehicle frame 12 and vehicle body 24 may have any suitable construction. The vehicle frame 12 and vehicle body 24 may be of any suitable material, for example, steel, aluminum, and/or fiber-reinforced plastic, etc.

The vehicle body 24 includes body panels (not numbered). The body panels may include structural panels, e.g., rockers, pillars, roof rails, etc. The body panels may include exterior panels. The exterior panels may present a class-A surface, e.g., a finished surface exposed to view by a customer and free of unaesthetic blemishes and defects. The body panels include, e.g., a roof panels, doors, fenders, hood, decklid, etc. The vehicle body 24 may define a passenger cabin to house occupants, if any, of the vehicle 10.

The vehicle frame 12 includes frame rails 26 and may include cross beams (not shown). The frame rails 26 are elongated along a vehicle-longitudinal axis A. The frame rails 26 are spaced from each other cross-vehicle. The cross beams of the vehicle frame 12 extend from one frame rail 26 to the other frame rail 26 transverse to the vehicle-longitudinal axis A.

The vehicle frame 12 includes two frame rails 26. The frame rails 26 may define the cross-vehicle boundaries of the vehicle frame 12. The frame rails 26 may be elongated along the vehicle-longitudinal axis A from a rear end of the vehicle 10 to a front end of the vehicle 10. For example, the frame rails 26 may extend along substantially the entire length of the vehicle 10. In other examples, the frame rails 26 may be segmented and extend under portions of the vehicle 10, e.g., at least extending from below a passenger compartment of the vehicle 10 to the front end of the vehicle 10. In some examples, each frame rails 26 may be unitary from the rear end of the vehicle 10 to the front end of the vehicle 10. In other examples, the frame rails 26 may include segments fixed to each other (e.g., by welding, threaded fastener, etc.) and in combination extending from a rear end of the vehicle 10 to the front end of the vehicle 10.

As set forth above, the vehicle frame 12 may have a body-on-frame construction in which the vehicle body 24 is supported on and affixed to the vehicle frame 12. In such an example, the frame rails 26 may include cab mount bracket 46s (not shown) on which the vehicle body 24 is supported and affixed. The cab mount bracket 46s are fixed to the frame rails 26, e.g., welded to the frame rails 26. The cab mount bracket 46s may extend outboard from the frame rail 26. The cab mount bracket 46 may be cantilevered from the frame rail 26. The cab mount bracket 46s are configured to support the vehicle body 24 in a body-on-frame configuration. For example, the cab mount bracket 46 may include a post or a hole that receives a hole or a post, respectively, of the vehicle body 24 to connect the vehicle body 24 to the vehicle frame 12. Specifically, the vehicle body 24 may be fixed to the cab mount bracket 46. During assembly of the vehicle 10, the vehicle body 24 is set on the vehicle frame 12 with fastening features of the vehicle body 24 aligned with the cab mount bracket 46s for engagement with the cab mount bracket 46s.

The vehicle frame 12 may include suspension and steering attachment points (not shown) that support suspension and steering components of the vehicle 10. As one example, the suspension and steering attachment points may be suspension towers. Suspension and steering components of the vehicle 10 are connected to the vehicle frame 12, at least in part, at the suspension towers. The suspension and steering components include suspension shocks, suspension struts, steering arms, steering knuckles, vehicle 10 wheels, etc.

The vehicle frame 12 may have a powertrain compartment designed (not numbered) to support and house a vehicle powertrain between the frame rails 26. For example, at least one of the cross-beams of the vehicle frame 12 may be a powertrain cradle, i.e., a cross-beam designed to support and affix to the vehicle 10 powertrain. The powertrain cradle may define a boundary of the powertrain compartment, e.g., a lower boundary of the powertrain compartment. The vehicle 10 powertrain in the powertrain compartment may be, for example, an internal combustion engine and a transmission, in which case the powertrain cradle is an engine cradle. In other examples, the vehicle frame 12, e.g., the frame rails 26 and/or the cross beams, are designed to support battery assemblies. The battery assembly may be of any suitable type for vehicular electrification to power propulsion of the vehicle 10, for example, lithium-ion batteries, nickel-metal hydride batteries, lead-acid batteries, or ultracapacitors, as used in, for example, plug-in hybrid electric vehicle 10s (PHEVs), hybrid electric vehicle 10s (HEVs), or battery electric vehicle 10s (BEVs).

The frame rails 26 and cross-beams may be extruded, roll-formed, etc. The frame rails 26 and cross-beams of the vehicle frame 12 may be of any suitable material, e.g., suitable types of steel, aluminum, and/or fiber-reinforced plastic, etc. The frame rails 26 and cross-beams may be hollow. The frame rails 26 and cross-beams may be rectangular in cross-section (e.g., a hollow rectangular cuboid), round in cross section, e.g., a hollow, round such as a hollow cylinder), etc.

The vehicle frame 12 includes the frame-rail ends 16 extending vehicle-forward of the frame rails 26, respectively. In other words, the vehicle frame 12 includes two frame-rail ends 16 with one frame-rail end 16 extending vehicle-forward of one of the frame rails 26 and the other frame-rail end 16 extending vehicle-forward of the other frame rail 26.

The frame-rail end 16 is fixed the respective frame rail 26. For example, the frame-rail end 16 may be fixed to the respective frame rail 26 by welding, fastening, etc. In the example shown in the Figures, the frame-rail end 16 is a component of the vehicle frame 12 that has a body-on-frame architecture, as described above. In other examples, the vehicle frame 12 may be of another architecture, e.g., a unibody architecture. In such examples, the frame rail 26 is a component of the vehicle frame 12 that has a unibody architecture and the frame-rail end 16 is connected to such frame rail 26.

The frame-rail end 16 is elongated along the vehicle-longitudinal axis A. For example, the frame-rail end 16 may be coaxial with the frame rail 26 at the connection of the frame-rail end 16 and the frame rail 26. The frame rail 26 has a vehicle-forward end 18 and the frame-rail end 16 extends vehicle-forward from the vehicle-forward end 18 of the frame rail 26. Specifically, the frame-rail end 16 has a vehicle-rearward end at the frame rail 26 and a vehicle-forward end 18 at the resettable energy absorber 22, as described further below.

The frame-rail end 16 includes a base 28 elongated along a vehicle-longitudinal axis A and a flange 30 extending radially from the base 28. The base 28 may include the vehicle-rearward end of the frame-rail end 16. The flange 30 may be at the vehicle-forward end 18 of the frame-rail end 16, as shown in the example shown in the Figures. In other examples, the base 28 may include the vehicle-forward end 18 and the flange 30 may be spaced vehicle-rearward of the vehicle-forward end 18.

The flange 30 includes a vehicle-forward face 32. The vehicle-forward face 32 faces in the vehicle-forward direction. The vehicle-forward face 32 may be planar, as shown in the example in the Figures. As set forth below, the resettable energy absorber 22 abuts the flange 30 at the vehicle-forward end 18 of the frame-rail end 16. The vehicle-forward face 32 of the flange 30 is at the vehicle-forward end 18 of the frame-rail end 16 in the example shown in the Figures. In other examples, the vehicle-forward face 32 of the flange 30 may be spaced vehicle-rearward of the vehicle-forward end 18 of the frame-rail end 16.

The frame-rail end 16 includes mounting holes 34. Specifically, the mounting holes 34 may be in the flange 30 as shown in the example in the Figures. In such examples, the mounting holes 34 extend through the vehicle-forward face 32 of the flange 30. The mounting holes 34 mount the plate 40 to the frame-rail end 16, as described further below.

The frame-rail end 16 includes a bore 20 at the vehicle-forward end 18 of the frame-rail end 16. The bore 20 extends through the vehicle-forward end 18 of the frame-rail end 16. In other words, the bore 20 is open at the vehicle-forward end 18 of the frame rail 26. The bore 20 may extend continuously through the frame-rail end 16 through both the vehicle-forward end 18 and the vehicle-rearward end of the frame rail 26. The bore 20 is elongated along the vehicle-longitudinal axis A. The frame-rail end 16 may be extruded, roll-formed, etc. The frame-rail end 16 may be of any suitable material, e.g., suitable types of steel, aluminum, and/or fiber-reinforced plastic, etc. The frame-rail end 16 may be hollow, i.e., the bore 20 makes the frame-rail end 16 hollow. The frame rails 26 and cross-beams may be rectangular in cross-section (e.g., a hollow rectangular cuboid), round in cross section, e.g., a hollow, round such as a hollow cylinder), etc.

The frame-rail ends 16 are designed to deform relative to the frame rail 26 during frontal-vehicle impact. Specifically, the frame-rail ends 16 deform vehicle-rearward to allow rearward movement of the bumper assembly 38 relative to the frame rails 26 to absorb energy during certain vehicle impacts. The frame-rail ends 16 may include features that direct deformation of the frame-rail end 16 toward the frame rail 26 during frontal impact of the bumper 14. These features may include wall geometry, wall thickness, dimples, cutouts, etc. The frame-rail ends 16 may be referred to in industry as crush cans.

Figure 1:
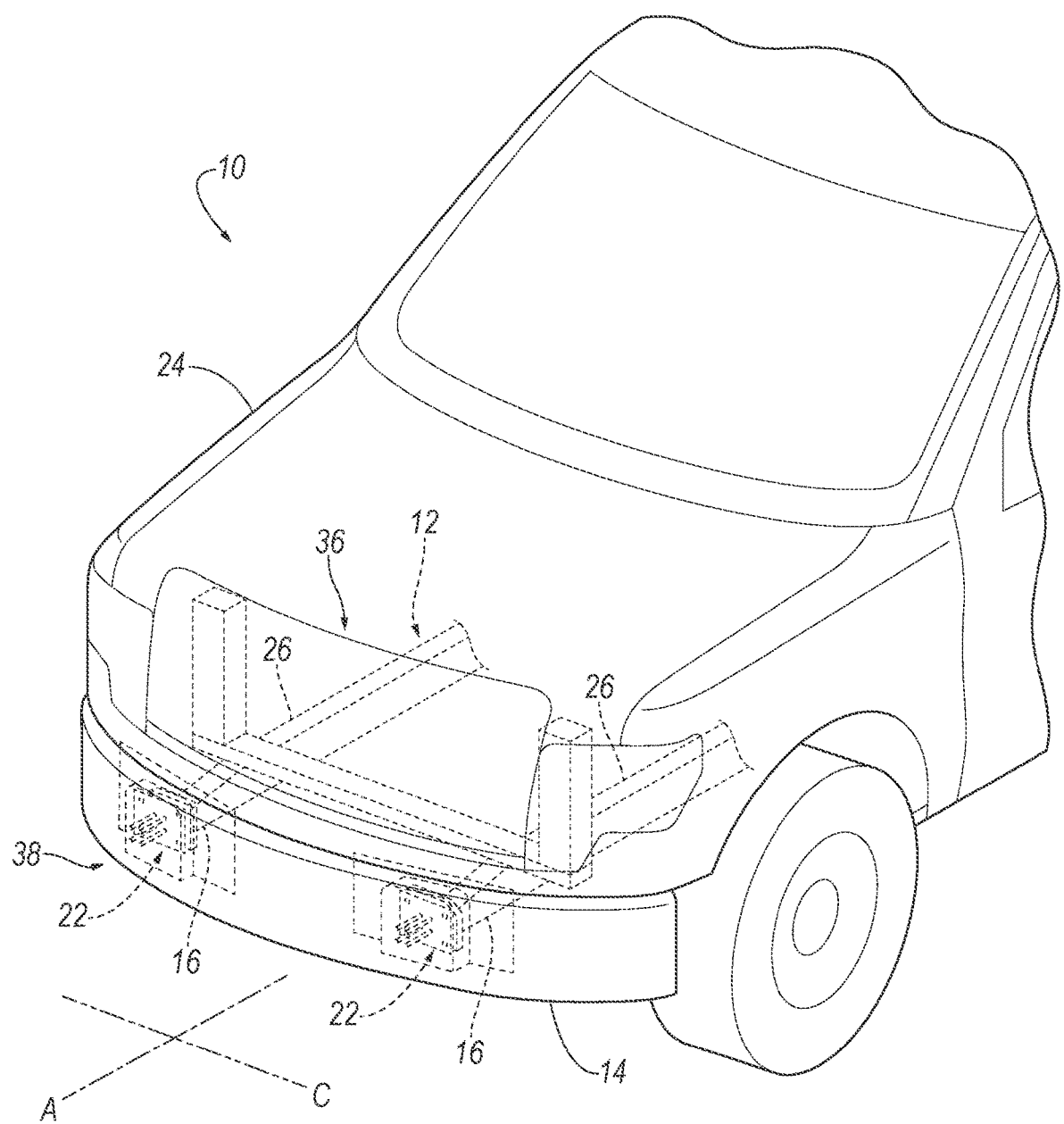
FIG. 1 is a perspective view of a vehicle including bumper and a resettable energy absorber.
Figure 2:
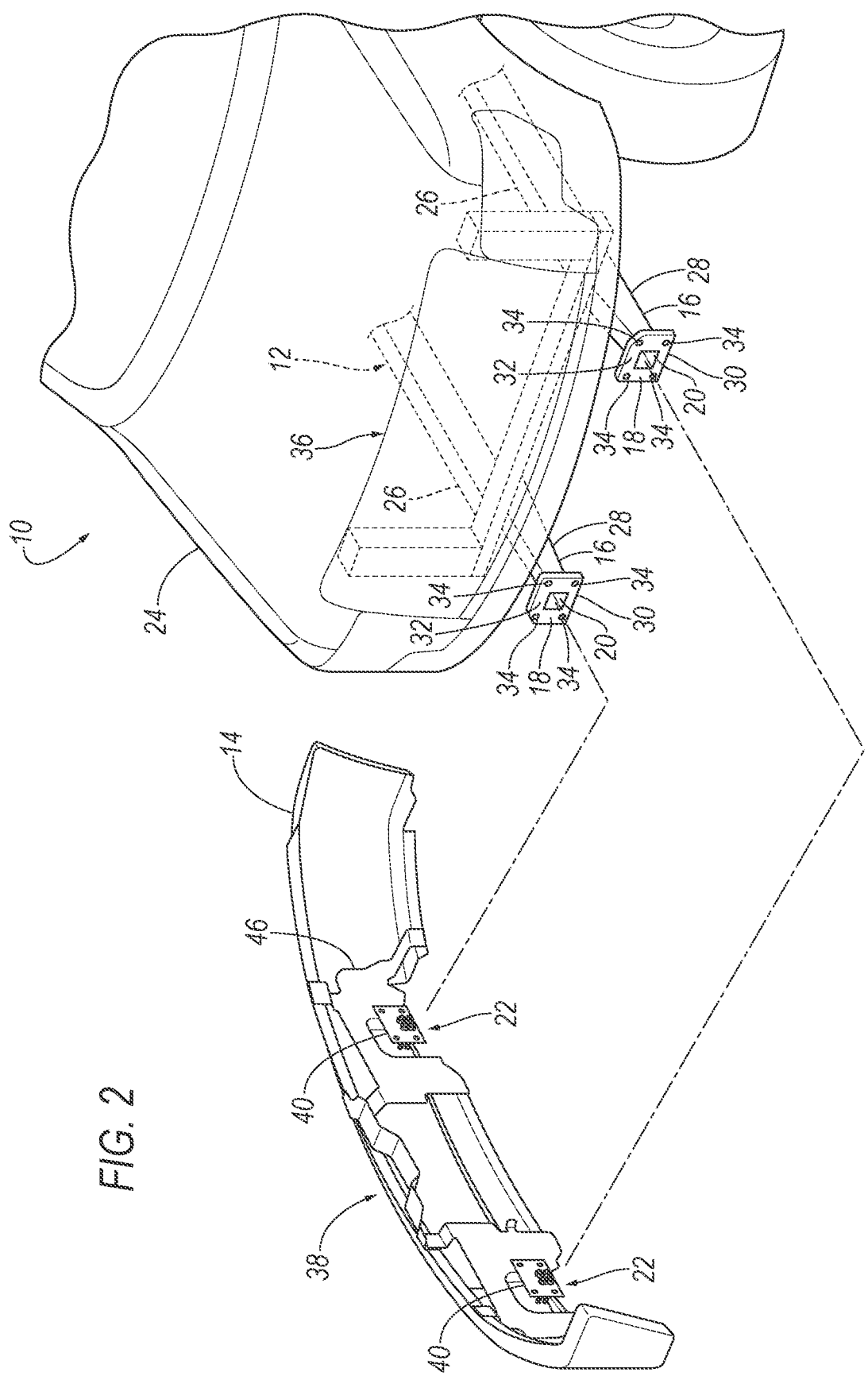
FIG. 2 is an exploded view of the vehicle with the bumper and resettable energy absorber exploded from a frame of the vehicle.
Figure 3:
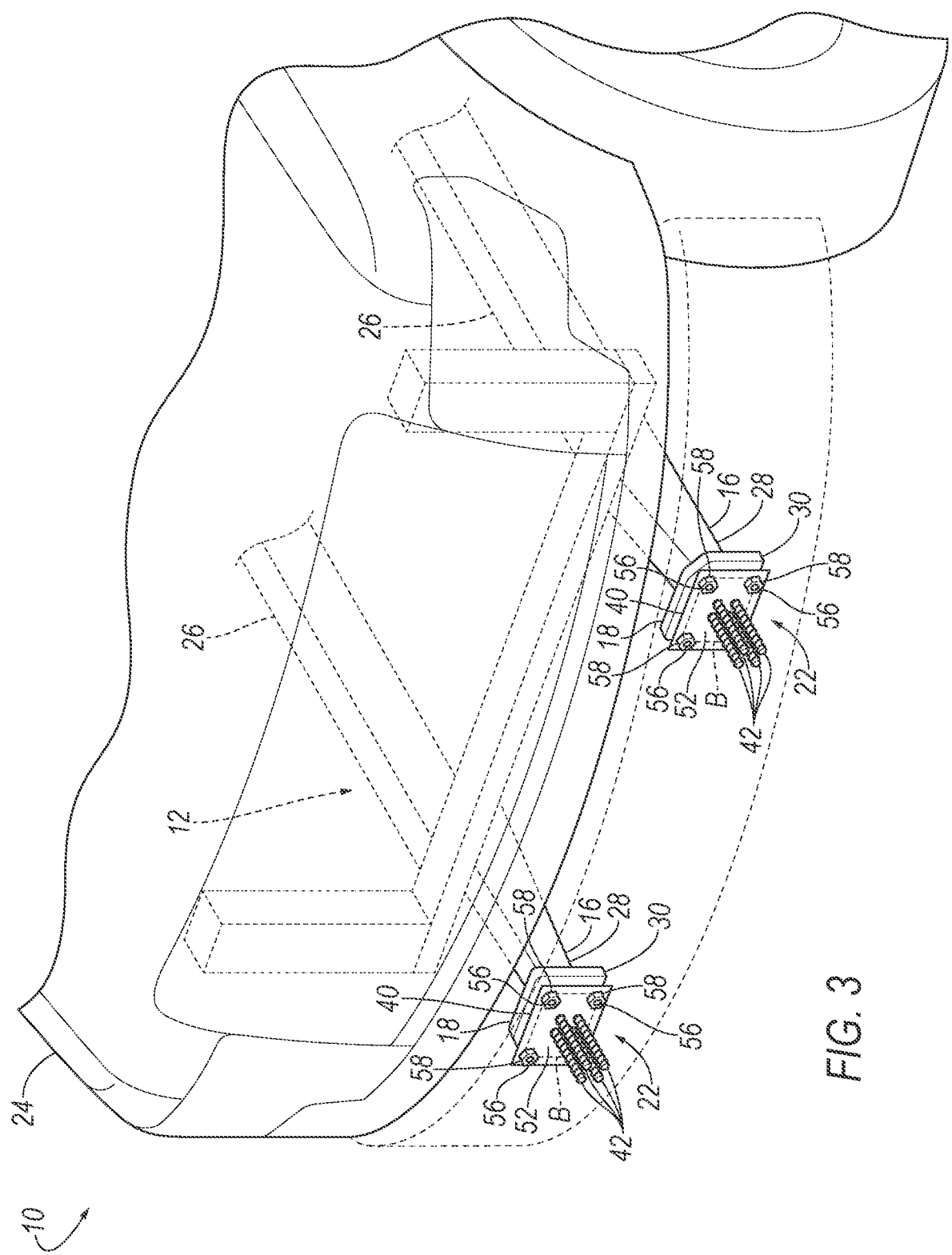
FIG. 3 is a magnified view of the bumper and resettable energy absorber.

With reference to FIGS. 1-3, the vehicle 10 has a front-end structure. The front-end structure includes a grill 36 and the bumper assembly 38. The grill 36 is above the bumper assembly 38. The grill 36 may be a component of the vehicle body 24 and may be supported on other components of the vehicle body 24.

The bumper assembly 38 includes the bumper 14 and the resettable energy absorber 22. The bumper 14 and the energy absorber may be parts-in-assembly (PIA), i.e., assembled as a unit to the vehicle frame 12 at a vehicle assembly plant.

The bumper assembly 38 is connected to the vehicle frame 12. Specifically, the bumper 14 is connected to the frame-rail ends 16 with the resettable energy absorber 22, as described further below.

The bumper 14 extends transversely to the frame rails 26, e.g., in a cross-vehicle direction C. With reference to FIGS. 1-3, the bumper 14 is elongated along the cross-vehicle direction C. The bumper 14 is supported by the vehicle frame 12, i.e., the weight of the bumper 14 is borne by the vehicle frame 12. The bumper assembly 38 may be a front bumper assembly, as shown in the Figures. In other words, the bumper assembly 38 may be at a front of the vehicle 10 and, in such examples, the bumper 14 extension is operable for frontal collisions of the vehicle 10.

The bumper 14 has a vehicle-forward face. The vehicle-forward face may be a class-A surface, i.e., a surface specifically manufactured to have a high-quality, finished aesthetic appearance free of blemishes. The bumper 14 may be of any suitable material such as metal (steel, aluminum, etc.), fiber-reinforced plastic, etc.

The bumper assembly 38 includes at least one resettable energy absorber 22. In the example shown in the Figures, the bumper assembly 38 includes two resettable energy absorbers 22. The resettable energy absorber 22 supports the bumper 14 at the vehicle-forward end 18 of the frame-rail end 16. When the resettable energy absorber 22 is mounted at the frame-rail end 16, the resettable energy absorber 22 is aligned with the vehicle-forward end 18 along the vehicle-longitudinal axis A. In the example shown in the Figures, the resettable energy absorber 22 is on the vehicle-forward end 18. Specifically, the flange 30 is at the vehicle-forward end 18 of the frame-rail end 16 and the resettable energy absorber 22 abuts the flange 30 on the vehicle-forward end 18 of the frame-rail end 16. In that example, the vehicle-forward face 32 of the flange 30 is at the vehicle-forward end 18 of the frame-rail end 16. In other examples, the vehicle-forward face 32 of the flange 30 may be spaced vehicle-rearward of the vehicle-forward end 18 of the frame-rail end 16.

The resettable energy absorber 22 includes a plate 40, a stud 42, and a spring 44 on the stud 42. In the example shown in the Figures, the energy absorber includes a plurality of studs 42 and a spring 44 on each of the studs 42. The resettable energy absorber 22 is moveable with the bumper 14 relative to the frame-rail end 16 between the extended position and the compressed position. Specifically, as described below, the bumper 14 and the studs 42 move as a unit relative to the plate 40 and the frame-rail end 16 between the extended position and the compressed position.

The studs 42 are elongated along the vehicle-longitudinal axis A from the bumper 14 to the plate 40. The studs 42 extend through the plate 40, as described further below. The studs 42 are fixed to the bumper 14. Specifically, an end of the stud 42 may be fixed to the stud 42 by, for example, welding or threaded engagement (e.g., threaded engagement with a weld nut fixed to the bumper 14). The bumper 14 may have a bracket 46 on the vehicle-rearward side of the bumper 14, as shown in the example, in the Figures, and the studs 42 may be fixed to the bracket 46. In such examples, the bracket 46 may be fixed relative to the class-A vehicle-forward surface of the bumper 14. The studs 42 may be, for example, metal. The studs 42 are rigid so that the studs 42 move with the bumper 14 relative to the plate 40 when the springs 44 are compressed, as described further below.

The studs 42 slidably extend through the plate 40 as the resettable energy absorber 22 strokes between the extended position and the compressed position. Specifically, the plate 40 includes stud holes 50 and the studs 42 extend through the stud holes 50 through a vehicle-forward face 52 and a vehicle-rearward face 54 of the plate 40. A head 48 on the stud 42 retains the stud 42 in the stud hole 50. Specifically, the head 48 abuts the vehicle-rearward face 54 of the plate 40 and the stud 42 extends from the head 48 vehicle-forward through the plate 40. The head 48 and the shaft may be non-unitary, i.e., formed separately and subsequently assembled, e.g., a nut engaged by threaded engagement (such as a lock nut, pinned nut, etc.), etc. As another example, the head 48 may be unitary with the stud 42. In other words, the head 48 and the stud 42 may be a single, uniform piece of material with no seams, joints, fasteners, or adhesives holding them together, i.e., formed together simultaneously as a single continuous unit, e.g., by machining from a unitary blank, molding, forging, casting, etc.

The head 48 is between the plate 40 and the frame-rail end 16. Specifically, the head 48 is in the bore 20 of the frame-rail end 16 in both the extended position and the compressed position. The head 48 abuts the vehicle-rearward face 54 of the plate 40 against the bias of the spring 44 when the resettable energy absorber 22 is in the extended position. When the bumper 14 is impacted with sufficient force to compress the spring 44, the stud 42 and the head 48 move vehicle-rearward as the spring 44 compresses. Specifically, as the head 48 moves vehicle-rearward, the head 48 moves vehicle-rearward relative to the vehicle-rearward face 54 of the plate 40. When force is released from the bumper 14, the springs 44 extend to move the head 48 toward the vehicle-rearward face 54 of the plate 40 until the head 48 abuts the vehicle-rearward face 54 of the plate 40 in the extended position of the resettable energy absorber 22 (thus making the energy absorber "resettable").

The spring 44 is between the plate 40 and the bumper 14. Specifically, the spring 44 may abut the plate 40 and the bumper 14, e.g., the bracket 46 of the bumper 14, in both the extended position and the compressed position of the resettable energy absorber 22. The spring 44 biases the bumper 14 vehicle-forward relative to the plate 40. Specifically, the spring 44 uses the plate 40 as a reaction surface to bias the bumper 14 vehicle-forward. The head 48 on the stud 42 retains the resettable energy absorber 22 and the bumper 14 in the extended position in the absence of force on the bumper 14 sufficient to compress the spring 44. The spring 44 is resiliently compressible between the plate 40 and the bumper 14. In other words, the spring 44 is compressed when forces on the bumper 14 exceed a force sufficient to compress the spring 44 and, when the force is removed from the bumper 14, the spring 44 returns to its pre-compressed state. Specifically, in the extended position, the spring 44 biases the bumper 14 vehicle-forward to abut the head 48 against the vehicle-rearward face 54 of the plate 40. When force on the bumper 14 exceeds a threshold to compress the spring 44, the spring 44 is compressed allowing the bumper 14 to move vehicle-rearward relative to the plate 40 and the head 48 moves vehicle-rearward relative to the plate 40. When the force is removed from the bumper 14, the spring 44 biases the bumper 14 vehicle-forward and returns the head 48 to abut the vehicle-rearward face 54.

The spring 44 may be on the stud 42 between the bumper 14 and the plate 40, as shown in the example in the Figures. In other words, the spring 44 wraps around the stud 42 between the bumper 14 and the plate 40. In the example shown in the Figures, the spring 44 is a helical coil spring. In that example, the spring 44 is coiled around the stud 42, i.e., helically extends around the stud 42. In other examples, the spring 44 may be of any suitable type and may extend around the stud 42 in any suitable shape.

The plate 40 abuts the frame-rail end 16, and more specifically, abuts the flange 30 on the vehicle-forward face 32 of the flange 30. The plate 40 supports the resettable energy absorber 22 and the bumper 14 on the vehicle frame 12, specifically the frame-rail end 16. The plate 40 may be, for example, planar. The plate 40 may be metal (steel, aluminum, etc.), fiber-reinforced plastic, etc.

The plate 40 includes mounting holes 56. The mounting holes 56 extend through the plate 40. The mounting holes 56 in the plate 40 are aligned with the mounting holes 34 in the flange 30.

As set forth above, the plate 40 is fixed to the frame-rail end 16. Specifically, the plate 40 is mounted to the vehicle-forward face 32 of the flange 30. Specifically, fasteners 58 connect the plate 40 to the frame-rail end 16. The fasteners 58 extend through the mounting holes 56 on the plate 40 and the mounting holes 34 on the flange 30 to connect the plate 40 to the flange 30. The fasteners 58 may be, for example, bolts retained in the mounting holes 34 by threaded engagement with a nut. As an example, as shown in the example in the figures, the fastener 58 includes a weld nut on the vehicle-forward face of the plate 40 and a threaded fastener that extends through the flange 30 and the plate 40 and threadedly engages the weld nut.

The mounting holes 34 on the plate 40 are spaced from each other in a pattern having an outer boundary B. Likewise, the fasteners 58 are spaced from each other on the plate 40 in the pattern having the outer boundary B. The stud 42 extends through the plate 40 inside the outer boundary B. Specifically, in examples including more than one stud 42, each of the studs 42 extends through the plate 40 inside the outer boundary B of the pattern of the fasteners 58 and mounting holes 34.

Specifically, lines extending between adjacent mounting holes 34 and fasteners form the outer boundary B of the pattern. The fasteners 58 are in a pattern such that the outer boundary B is an endless loop. In the example shown in the figures, the outer boundary B is rectangular. In other words, four fasteners 58 connect the plate 40 to the frame-rail end 16 and the four fasteners 58 are spaced from each other on the plate 40 in a rectangular pattern. In such an example, the studs 42 extend through the plate 40 inside the rectangular pattern. In other examples, the pattern may have any suitable number of vertices, i.e., three or more, with one of the fasteners at each vertices.

The position of the mounting holes 34 and the studs 42 inside the outer boundary Ballows for mounting of the plate 40 to the flange 30 with the studs 42 in position to stroke into the frame-rail end 16 from the extended position to a compressed position. Specifically, the studs 42 are aligned with the bore 20 of the frame-rail end 16. More specifically, the studs 42 are aligned with the bore 20 vertically and in the cross-vehicle direction C such that the studs 42 can stroke into the bore 20 as the bumper 14 and the resettable energy absorber 22 move from the extended position to a compressed position. As set forth above, the head 48 on the stud 42 may be in the bore 20 in both the extended position and the compressed position, as shown in the example in the figures.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
a vehicle frame having a frame-rail end, the frame-rail end having a vehicle-forward end and a bore at the vehicle-forward end;
a bumper; and
a resettable energy absorber supporting the bumper at the vehicle-forward end of the frame-rail end, the resettable energy absorber being moveable with the bumper relative to the frame-rail end between an extended position and a compressed position, the resettable energy absorber extending into the bore of the frame-rail end from the extended position to the compressed position;
the energy absorber includes a plate fixed to the frame-rail end, a stud fixed to the bumper and slidably extending through the plate, and a spring on the stud between the bumper and the plate; and
a head on the stud between the plate and the frame-rail end.

2. The vehicle as set forth in claim 1, wherein the head is in the bore of the frame-rail end in both the extended position and the compressed position.

3. The vehicle as set forth in claim 1, further comprising fasteners connecting the plate to the frame-rail end, the fasteners being spaced from each other on the plate in a pattern having an outer boundary, the stud extending through the plate inside the outer boundary of the pattern.

4. The vehicle as set forth in claim 1:
wherein the frame-rail end includes a base elongated along a vehicle-longitudinal axis and a flange extending radially from the base; and
further comprising fasteners connecting the plate to the flange.

5. The vehicle as set forth in claim 1, wherein the spring is resiliently compressible between the plate and the bumper.

6. The vehicle as set forth in claim 1, wherein the spring is a coil spring.

7. The vehicle as set forth in claim 6, wherein the spring is coiled around the stud.

8. The vehicle as set forth in claim 1, wherein the stud is further defined as a plurality of studs each fixed to the bumper and slidably extending through the plate, and the spring is further defined as a plurality of springs with the springs on the studs, respectively, between the bumper and the plate.

9. The vehicle as set forth in claim 8, further comprising fasteners connecting the plate to the frame-rail end, the fasteners being spaced from each other on the plate in a pattern having an outer boundary, the studs extending through the plate inside the outer boundary of the pattern.

10. The vehicle as set forth in claim 8, further comprising four fasteners connecting the plate to the frame-rail end, the four fasteners being spaced from each other on the plate in a rectangular pattern, the studs extending through the plate inside the rectangular pattern.

11. The vehicle as set forth in claim 8:
wherein the frame-rail end includes a base elongated along a vehicle-longitudinal axis and a flange extending radially from the base; and
further comprising fasteners connecting the plate to the flange.

12. The vehicle as set forth in claim 11, wherein the fasteners are spaced from each other on the plate in a pattern having an outer boundary, the stud extending through the plate inside the outer boundary of the pattern.

13. The vehicle as set forth in claim 1, wherein the vehicle frame includes frame rails elongated along a vehicle-longitudinal axis, the frame-rail ends extending vehicle-forward of the frame rails, respectively.

14. The vehicle as set forth in claim 13, wherein the frame-rail ends are designed to deform relative to the frame rail during frontal-vehicle impact.

15. The vehicle as set forth in claim 14, wherein the frame-rail end is elongated along the vehicle-longitudinal axis.

16. A vehicle comprising:
a vehicle frame having a frame-rail end, the frame-rail end having a vehicle-forward end and a bore at the vehicle-forward end;
a bumper;
a resettable energy absorber supporting the bumper at the vehicle-forward end of the frame-rail end, the resettable energy absorber being moveable with the bumper relative to the frame-rail end between an extended position and a compressed position, the resettable energy absorber extending into the bore of the frame-rail end from the extended position to the compressed position;
the energy absorber including a plate fixed to the frame-rail end, a plurality of studs fixed to the bumper and slidably extending through the plate, and a spring on each stud between the bumper and the plate; and
fasteners connecting the plate to the frame-rail end, the fasteners being spaced from each other on the plate in a pattern having an outer boundary, the studs extending through the plate inside the outer boundary of the pattern.

17. The vehicle as set forth in claim 16, wherein the frame-rail ends are designed to deform relative to the frame rail during frontal-vehicle impact.

18. A vehicle comprising:
a vehicle frame having a frame-rail end, the frame-rail end having a vehicle-forward end and a bore at the vehicle-forward end;
a bumper;
a resettable energy absorber supporting the bumper at the vehicle-forward end of the frame-rail end, the resettable energy absorber being moveable with the bumper relative to the frame-rail end between an extended position and a compressed position, the resettable energy absorber extending into the bore of the frame-rail end from the extended position to the compressed position;
the energy absorber including a plate fixed to the frame-rail end, a plurality of studs fixed to the bumper and slidably extending through the plate, and a spring on each stud between the bumper and the plate;
the frame-rail end including a base elongated along a vehicle-longitudinal axis and a flange extending radially from the base; and
fasteners connecting the plate to the flange.

19. The vehicle as set forth in claim 18, wherein the fasteners are spaced from each other on the plate in a pattern having an outer boundary, the stud extending through the plate inside the outer boundary of the pattern.

20. The vehicle as set forth in claim 18, wherein the frame-rail ends are designed to deform relative to the frame rail during frontal-vehicle impact.

* * * * *